US009769173B1

(12) United States Patent
Jones et al.

(10) Patent No.: US 9,769,173 B1
(45) Date of Patent: Sep. 19, 2017

(54) SYSTEM, METHOD, AND COMPUTER PROGRAM FOR ALLOWING USERS ACCESS TO INFORMATION FROM A PLURALITY OF EXTERNAL SYSTEMS UTILIZING A USER INTERFACE

(71) Applicant: Amdocs Software Systems Limited, Dublin (IE)

(72) Inventors: Robert J. Jones, Palm Bay, FL (US); Tatiana Zagorovski, Chesterfield, MO (US)

(73) Assignees: Amdocs Software Systems Limited, Dublin (IE); Amdocs Development Limited, Limassol (CY)

( * ) Notice: Subject to any disclaimer, the term of this patent is extended or adjusted under 35 U.S.C. 154(b) by 0 days.

(21) Appl. No.: 14/525,086

(22) Filed: Oct. 27, 2014

(51) Int. Cl.
H04L 9/32 (2006.01)
H04L 29/06 (2006.01)
H04L 29/08 (2006.01)

(52) U.S. Cl.
CPC ............ *H04L 63/101* (2013.01); *H04L 67/10* (2013.01)

(58) Field of Classification Search
CPC .............................. H04L 63/101; H04L 67/10
See application file for complete search history.

(56) References Cited

U.S. PATENT DOCUMENTS

| 6,502,102 | B1 * | 12/2002 | Haswell | G06F 11/3664 |
| 6,701,514 | B1 * | 3/2004 | Haswell | G06F 11/3664 707/999.102 |
| 7,127,745 | B1 * | 10/2006 | Herse | G06F 21/6209 726/15 |
| 7,334,162 | B1 * | 2/2008 | Vakrat | G06F 11/2294 714/38.1 |
| 7,516,438 | B1 * | 4/2009 | Leonard | G06Q 10/10 706/13 |
| 7,657,872 | B2 * | 2/2010 | Kelbaugh | G06F 11/3664 714/38.1 |
| 8,893,087 | B2 * | 11/2014 | Maddela | G06F 8/70 714/745 |
| 9,154,611 | B1 * | 10/2015 | Jackson | H04L 41/0253 |
| 2002/0049962 | A1 * | 4/2002 | Kelbaugh | G06F 11/3664 717/128 |
| 2003/0074606 | A1 * | 4/2003 | Boker | G06F 11/3495 714/42 |
| 2003/0204784 | A1 * | 10/2003 | Jorapur | G06F 11/3684 714/38.14 |

(Continued)

OTHER PUBLICATIONS

STIC Search Strategy Report (Requested May 4, 2017).*

*Primary Examiner* — Sharon Lynch
(74) *Attorney, Agent, or Firm* — Zilka-Kotab, PC

(57) ABSTRACT

A system, method, and computer program product are provided for allowing users to access information from a plurality of external systems utilizing a user interface. In use, a plurality of external systems with which to communicate are identified. Additionally, a connection type associated with each of the plurality of external systems is identified. Further, information associated with each of the plurality of external systems to access is identified. In addition, a plurality of logical modules are configured based on the identified information. Furthermore, user groups are identified for each of the plurality of logical modules. Moreover, access levels associated with each of the plurality of logical modules are defined for each of the identified user groups.

4 Claims, 6 Drawing Sheets

(56) References Cited

U.S. PATENT DOCUMENTS

| | | | | |
|---|---|---|---|---|
| 2004/0107415 | A1* | 6/2004 | Melamed | G06F 11/3684 717/124 |
| 2006/0120526 | A1* | 6/2006 | Boucher | G06F 21/6218 380/247 |
| 2008/0109871 | A1* | 5/2008 | Jacobs | H04L 63/20 726/1 |
| 2008/0319999 | A1* | 12/2008 | Simpson | G06F 21/604 |
| 2009/0307763 | A1* | 12/2009 | Rawlins | G06F 11/2294 726/5 |
| 2010/0115580 | A1* | 5/2010 | Zurko | G06F 21/6218 726/1 |
| 2011/0231908 | A1* | 9/2011 | Simpson | G06F 21/604 726/4 |
| 2013/0179858 | A1* | 7/2013 | Mecke | G06F 11/3688 717/106 |
| 2013/0291127 | A1* | 10/2013 | Bergman | G06F 17/30 726/30 |
| 2013/0298188 | A1* | 11/2013 | Simpson | G06F 21/604 726/1 |
| 2014/0259092 | A1* | 9/2014 | Boucher | G06F 21/6218 726/1 |
| 2015/0007149 | A1* | 1/2015 | Maddela | G06F 8/70 717/131 |
| 2015/0046972 | A1* | 2/2015 | Zurko | G06F 21/6218 726/1 |
| 2015/0089583 | A1* | 3/2015 | Wanser | H04L 63/10 726/1 |
| 2016/0026560 | A1* | 1/2016 | Jackson | H04L 41/0253 714/38.1 |

* cited by examiner

FIGURE 3

DIPAT

File　Lightspeed Links　QC Tools　Testing Tools　DM Tools　Checklist Tools　Triage Tools　Utilities　Help

| Defect Details | Reengagement Checklist |

| Ownership | Defect Review | Internal Investigation | External Investigation | Defect Assignment |

This is the charter of Triage: Defect Assignment. The Triage team should not be involved in resolution.

Assignment Type　[ Select the Assignment Type ▼ ]

Assigning Defect to an Application:

- Update the Assigned to App field in QC　[ Assign to an Application/Team ▼ ]
- Update the Assigned to Team Field in QC　[▼]
- Update the Assigned to Sub Team field in QC　[▼]
- Update <ProgramDMStatus> comment in QC with details of the assignment
- Update the Triage Assignment field in QC (refer to Triage Assignment Field Guidelines)　[▼]
- Update the Program DM field in QC　[▼]
- Remove Chat Room and/or Ad Hoc bridge details from CTEM　[ ]
- Add a "Lessons Learned"　[ ]
- Before leaving the chat room, please click the button to copy handoff comment to chat　[ ]
- Change your Q status to "Available"　[ ]

[ Add a new Lessons Learned ]

[ Copy Chatroom Handoff Comment ]

[ Save and Close Checklist ]

STANDARD_PROJECT_STRUCTURE -- Release_2014_Sept_

FIGURE 4

SYSTEM, METHOD, AND COMPUTER PROGRAM FOR ALLOWING USERS ACCESS TO INFORMATION FROM A PLURALITY OF EXTERNAL SYSTEMS UTILIZING A USER INTERFACE

FIELD OF THE INVENTION

The present invention relates to the application lifecycle and more particularly to simplifying access to data in external systems, in the context of the application lifecycle management.

BACKGROUND

In complex, large-scale software projects, various users such as testers and technical support resources are required to validate data and check logs in different systems involved in end-to-end or integrated flows in test and production environments, and to update multiple statuses in various tools. In order to accomplish this, currently, users are required to switch between various applications and tools, and in some cases they also have to contact external teams to perform some of the validations where users lack technical or application knowledge.

As a result, time is not necessarily spent performing actual validations but on opening/logging into the necessary tools, preparing and executing database queries or UNIX scripts, and on waiting for responses from the external teams.

There is thus a need for addressing these and/or other issues associated with the prior art.

SUMMARY

A system, method, and computer program product are provided for allowing users to access information from a plurality of external systems utilizing a user-interface. In use, a plurality of external systems with which to communicate are identified. Additionally, a connection type associated with each of the plurality of external systems is identified. Further, information associated with each of the plurality of external systems to access is identified. In addition, a plurality of logical modules are configured based on the identified information. Furthermore, user groups are identified for each of the plurality of logical modules. Moreover, access levels associated with each of the plurality of logical modules are defined for each of the identified user groups.

BRIEF DESCRIPTION OF THE DRAWINGS

FIG. 3 illustrates a user interface for performing a text search in a defect tracking system using an API search and/or a database search, in accordance with one embodiment.

FIG. 4 illustrates a user interface for process automation, in accordance with one embodiment.

DETAILED DESCRIPTION

Figure 1:
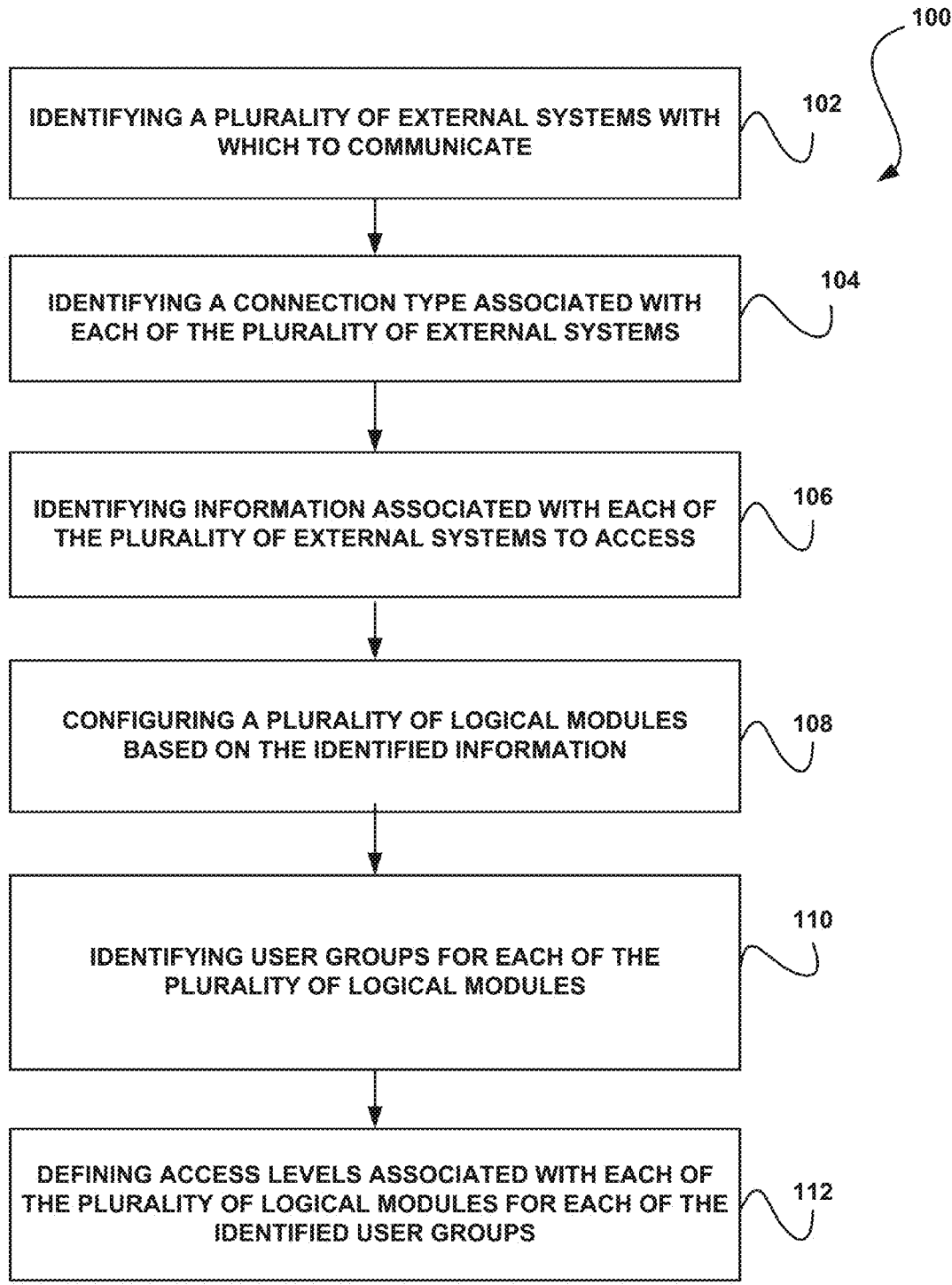
FIG. 1 illustrates a method for allowing users to access information from a plurality of external systems utilizing a user interface, in accordance with one embodiment.

FIG. 1 illustrates a method 100 for allowing users to access information from a plurality of external systems utilizing a user interface, in accordance with one embodiment.

As shown, a plurality of external systems with which to communicate are identified. See operation 102. In the context of the present description, external systems refer to any hardware, software, or combination of hardware and software, that is separate from, or external to, a system associated with the method 100 (e.g. a system implementing steps associated with the method 100, etc.).

For example, the external systems may include one or more of a defect tracking system, a website, a network, a database, and/or a UNIX server. Additionally, the external systems may include one or more applications associated with one or more of a defect tracking system, a website, a network, a database, and/or a UNIX server. Further, in one embodiment, the external systems may include systems associated with at least one testing project. For example, the method 100 may be implemented in the context of a testing project (e.g. for performing validations associated with a testing project, etc.).

As shown further in FIG. 1, a connection type associated with each of the plurality of external systems is identified. See operation 104. The connection type may include, or be associated with, any type of connection and the systems may be associated with more than one connection type.

Further, information associated with each of the plurality of external systems to access is identified. See operation 106. The information may include any type of information associated with the system and/or a testing project. In addition, a plurality of logical modules are configured based on the identified information. See operation 108.

In one embodiment, configuring the logical modules based on the identified information may include configuring the logical modules to be displayed as menus or sub-menus (e.g. utilizing a graphical user interface). Additionally, in another embodiment, configuring the logical modules based on the identified information may include configuring at least one of the logical modules to perform a technical operation. For example, the technical operation may include a database validation. As another example, the technical operation may include a UNIX log retrieval.

Additionally, in one embodiment, configuring the logical modules based on the identified information may include configuring at least one of the modules to interface with a single application (e.g. a single application associated with one of the external systems). In another embodiment, configuring the logical modules based on the identified information may include configuring at least one of the modules to interface with a plurality of applications (e.g. associated with the external systems).

Additionally, operations to be performed in each of the logical modules may be defined in a technical form depending on a corresponding connection type required to interface with a corresponding one of the external systems. Further, in one embodiment, configuring the plurality of logical modules based on the identified information may include configuring the logical modules in accordance with at least one user group (e.g. testers belonging to a certain testing team/project).

As shown further in FIG. 1, user groups are identified for each of the plurality of logical modules. See operation 110. Moreover, access levels associated with each of the plurality of logical modules are defined for each of the identified user groups. See operation 112.

In one embodiment, the method 100 may further include displaying information associated with each of the plurality of logical modules to one or more users of the identified groups based on the defined access levels associated with each of the plurality of logical modules for each of the identified user groups. Further, a user interface may be configured to display information associated with one or more of the logical modules based on a defined access level associated with a user, without requiring the user to log into one or more of the plurality of external systems to access the one or more of the plurality of logical modules. In this case, the user interface may be configured in response to a login request by the user.

Additionally, the method 100 may include identifying a first user requesting to access a user interface capable of displaying information associated with the plurality of logical modules. In this case, one or more of the plurality of logical modules in which the first user is permitted to access may be identified, based on an access level associated with the first user. Further, at least a portion of the identified one or more of the plurality of logical modules in which the first user is permitted to access may be presented utilizing the user interface, without requiring the user to log into one or more of the plurality of external systems to access the one or more of the plurality of logical modules. In this case, the first user may not be able to access at least one of the plurality of logical modules that are associated with a second user. It should be noted that the method 100 may be implemented automatically with little or no user intervention.

Accordingly, in one embodiment, the method 100 may be implemented as an algorithm and tool that allows users, such as software testers or technical support personnel, to perform various validations and updates in different applications and tools from one place, instead of logging into each and every application and tool separately. Furthermore, the method 100 may function to provide a unified interface to all incorporated tools eliminating the necessity to learn interfaces of additional external tools.

Additionally, the method 100 will allow users to bypass any lack of technical knowledge and perform tasks such as database validations or log searches without writing any SQL scripts or UNIX commands. Further, the method 100 may be implemented to automate and standardize the process of interacting with applications/tools, thus reducing the manual interaction needed and reducing the chance of errors. The method 100 may increase self-sufficiency of software testers and support teams, providing a convenient way of getting back the results they need as quickly and efficiently as possible, with limited risk of errors and minimal overhead of interfacing systems.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

In complex, large-scale software projects, testers and technical support resources are required to validate data and check logs in different systems involved in end-to-end tests or integrated flows, and to update multiple statuses in various tools. In order to accomplish this, currently, users are required to switch between various applications and tools and, in some cases, they also have to contact external teams to perform some of the validations where users lack technical or application knowledge. As a result, time is not necessarily spent performing actual validations but rather on opening/logging into the necessary tools, preparing and executing database queries or UNIX scripts, and on waiting for responses from the external teams.

The techniques described herein may be implemented to employ a tool to allow users to bypass the lack of technical knowledge and perform various backend validations of different applications as well as to update different systems in a fast and efficient way using a single user friendly tool. Additionally, the tool may be used to provide an ability to automate and standardize the processes of interacting with various applications/tools and thus reduce the manual interaction needed and reduce the chance of errors.

In operation, first, applications the tool will interact with are identified, in addition to their connection type and information needed to be pulled from, or updated in, those applications/external systems. These applications/external systems may be defect tracking systems, websites, networks, databases, and/or UNIX servers.

Second, based on the collected information, logical modules may be configured (e.g. which may be displayed as menus and sub-menus for the end users). In various embodiments, the modules may be setup for either a group of technical operations (e.g. such as database validations or UNIX logs retrieval, etc.) or to interface with a single application. Operations that will be performed in each module may be defined in their technical form depending on the connection type required to interface with each of the systems.

For example, for operations performed via querying or updating a database, the actual SQL statements may be defined along with input parameters. As another example, for operations performed via UNIX scripts, the actual scripts along with input parameters may be defined. Further, each module setup may include defining connections/environments that will be used. For example, a database that supports multiple environments may have different connections for those environments.

Third, the tool may be used to identify and setup user groups and their access level to each module, as well as access level for operations inside the module. For example, testing personnel may not be able to see modules created for technical support personnel. Additionally, within modules accessible to testing resources, some operations may be enabled only for users having a specific access level (e.g. a supervisor access level, etc.).

Further, the tool may be utilized to identify and setup the first screen that will be presented to each group of users after login to the tool. For example, for testing and testing support teams this may be a GUI representing a defect tracking system. The end user, such as a software tester, may be presented with the first screen and set of menus relevant to the user's profile. After selecting the necessary module, users may have to select input options via dropdowns, check boxes, or enter some input parameter manually into text areas (e.g. if required by the operation logic, etc.).

Figure 2:
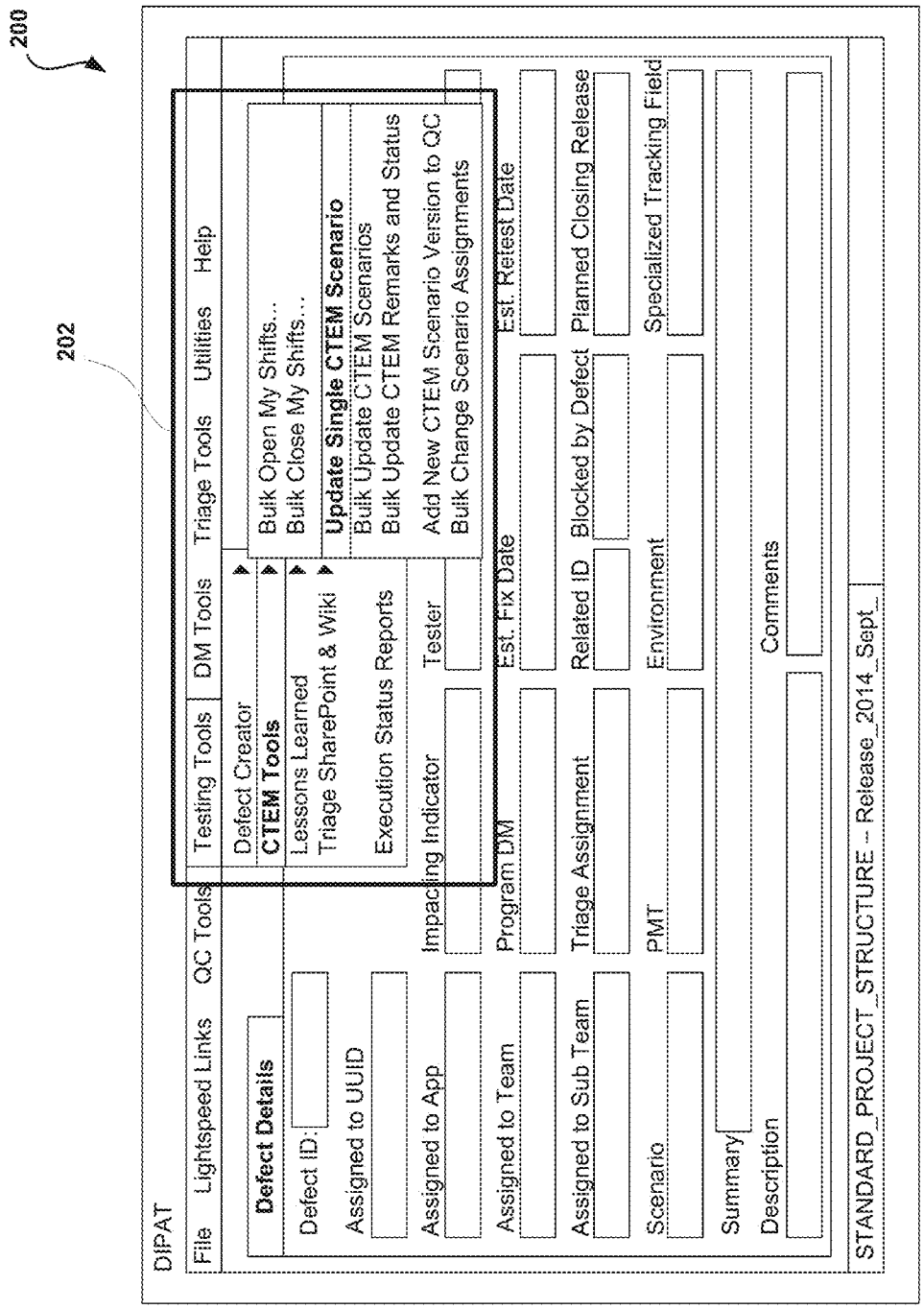
FIG. 2 illustrates a user interface showing a first screen that may be presented to each group of users after login to a tool for allowing users to access information from a plurality of external systems, in accordance with one embodiment.

FIG. 2 illustrates a user interface 200 showing a first screen that may be presented to each group of users after login to a tool for allowing users to access information from a plurality of external systems, in accordance with one embodiment. As an option, the user interface 200 may be implemented in the context of the details of FIG. 1. Of course, however, the user interface 200 may be implemented in the context of any desired environment. Further, the aforementioned definitions may equally apply to the description below.

As shown, the user interface 200 shows a first screen and menu selection options. In this example, the user interface includes a testing module 202 with tools and operations relevant to a testing team.

For some operations, users may have to also select which connection/environment they want to use. For example, a database that supports multiple environments may have different connections for those environments. If the required connection is not listed, the user may have the option to enter the connection details manually, depending on needs of the user.

Once all options and input values are selected, the user may execute the required operation. The tool may then analyze the input to ensure it meets the criteria of the selected action. For example, if the user inputs an alphanumeric value when only a numeric value is expected, the tool may not execute the query and may notify the user of the discrepancy. If all the input is validated successfully, the tool will execute the operation and present the results to the user in the GUI. For example, the user may receive a message that a new defect was successfully added to a defect tracking system or a SharePoint list was updated, etc.

In case of a database query or a UNIX script execution, the user can view the actual query or script that was executed, if the user needs to validate what was done. Along with viewing the results, users may be given option to save the results to their local system or export the results to a file (e.g. a spreadsheet, etc.) with one click, and in some cases perform additional actions such as sending an email in a certain format, performing an additional query, or downloading a certain file to the local system.

Figure 3:
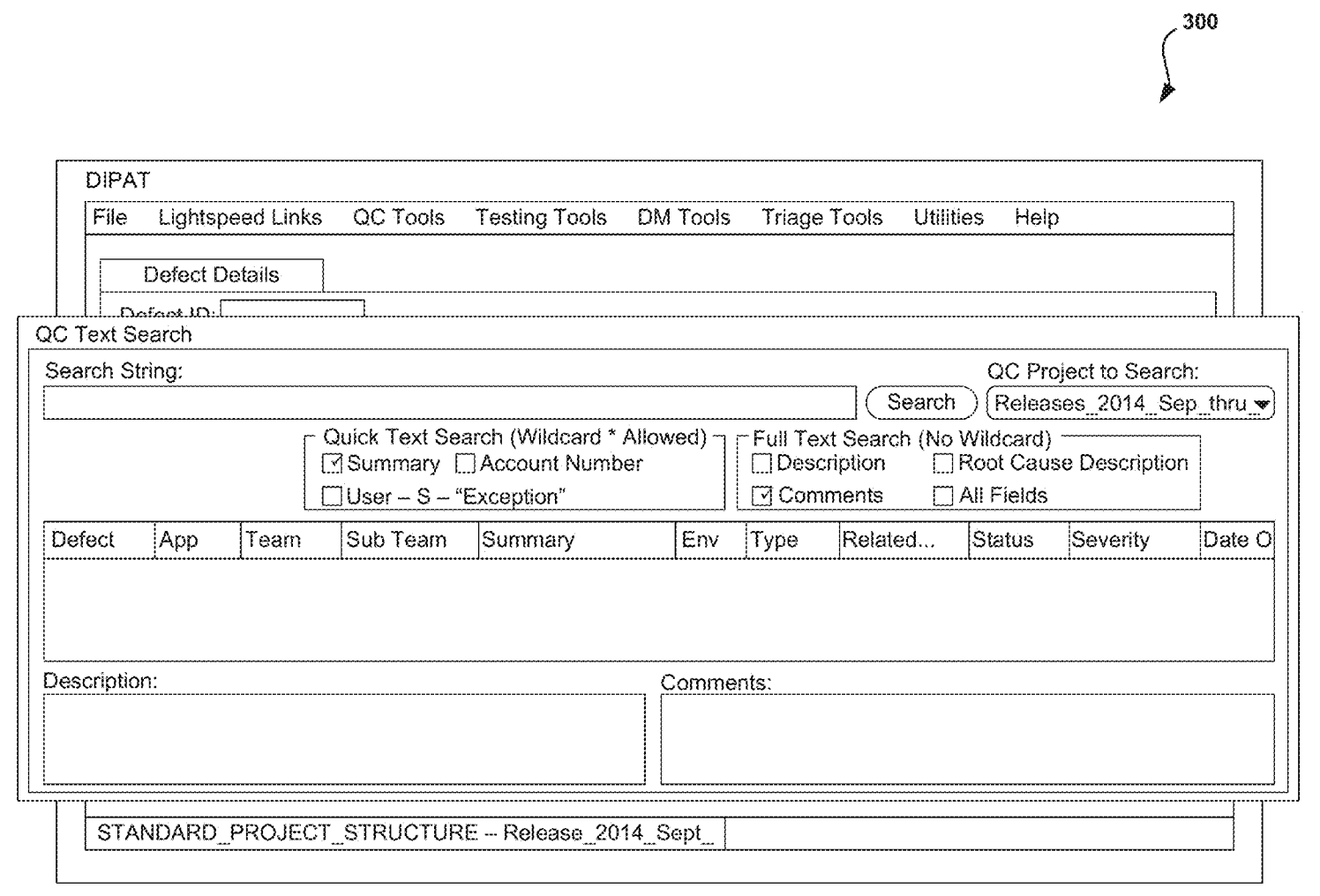

FIG. 3 illustrates a user interface 300 for performing a text search in a defect tracking system using an API search and/or database search, in accordance with one embodiment. As an option, the user interface 300 may be implemented in the context of the details of the previous Figures. Of course, however, the user interface 300 may be implemented in the context of any desired environment. Further, the aforementioned definitions may equally apply to the description below.

As shown, the user interface 300 includes options to perform an API interface quick search and/or a fall database search.

In one embodiment, every module may run in a separate thread and, in this case, users may perform different operations on different systems in parallel. For example, users may query a database while searching for logs in a UNIX server and updating a defect tracking system.

Modules for teams that have a process requiring them to follow a certain sequence of actions may be setup in a way to automate this process to be a dynamic interaction with users to simplify the process and remove the risk of error or deviation from the process.

FIG. 4 illustrates a user interface 400 for process automation, in accordance with one embodiment. As an option, the user interface 400 may be implemented in the context of the details of the previous Figures. Of course, however, the user interface 400 may be implemented in the context of any desired environment. Further, the aforementioned definitions may equally apply' to the description below.

As shown, the user interface 400 may display all major steps in a process 402, minor steps within a process 404, and additionally optional steps in the process 406. The user interface 400 may also include options 408 that dynamically change the process steps shown.

The techniques described herein may be utilized to provide a full one-stop-shop solution allowing users even without deep technical knowledge to perform all necessary validations associated with testing projects quickly, correctly and from a single interface.

In one embodiment, the tool may allow users to save encrypted login credentials to various systems or retrieve the credentials from a centralized secured repository. Additionally, in one embodiment, the tool may have a built in timer that can send a keep-alive signal to any system that has a pre-defined timeout interval due to user's inactivity.

Figure 5:
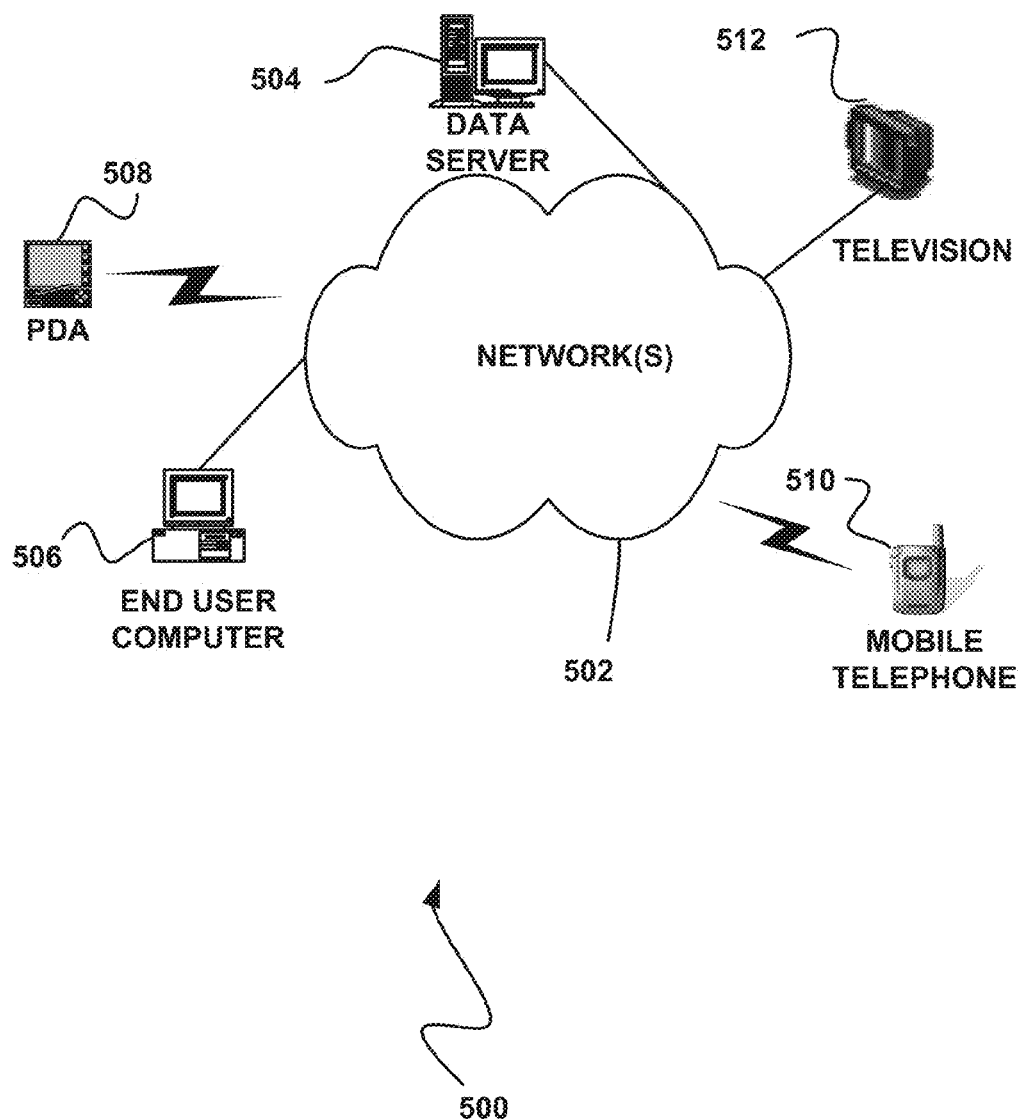
FIG. 5 illustrates a network architecture, in accordance with one possible embodiment.

FIG. 5 illustrates a network architecture 500, in accordance with one possible embodiment. As shown, at least one network 502 is provided. In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 504 and an end user computer 506 may be coupled to the network 502 for communication purposes. Such end user computer 506 may include a desktop computer, lap-top computer, and/or any other type of logic. Still yet, various other devices may be coupled to the network 502 including a personal digital assistant (PDA) device 508, a mobile phone device 510, a television 512, etc.

Figure 6:
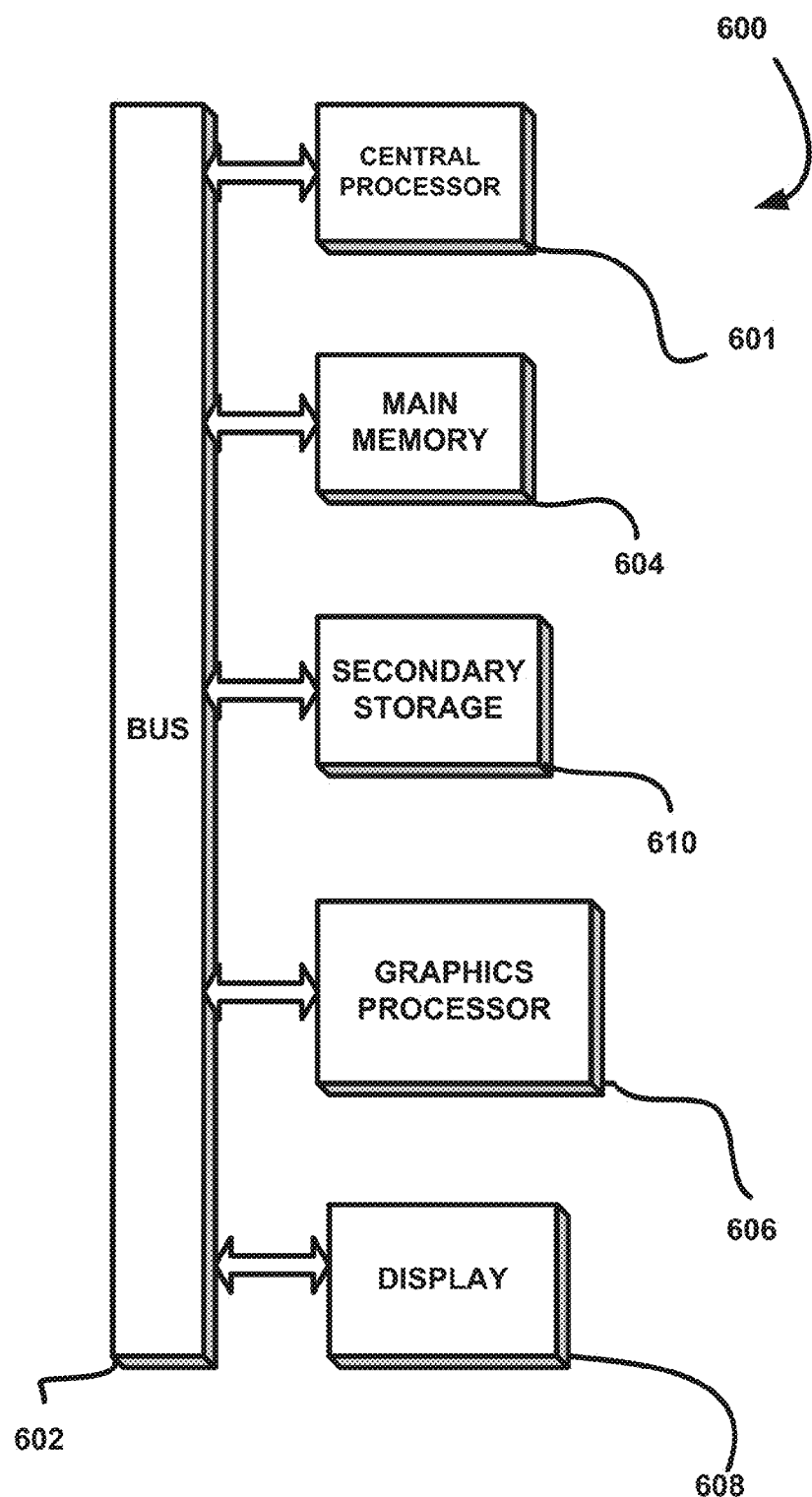
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. Of course, the system 600 may be implemented in any desired environment.

As shown, a system 600 is provided including at least one central processor 601 which is connected to a communication bus 602. The system 600 also includes main memory 604 [e.g. random access memory (RAM), etc.]. The system 600 also includes a graphics processor 606 and a display 608.

The system 600 may also include a secondary storage 610. The secondary storage 610 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 604, the secondary storage 610, and/or any other memory, for that matter. Such computer programs, when executed, enable the system 600 to perform various functions (as set forth above, for example). Memory 604, storage 610 and/or any other storage are possible examples of tangible computer-readable media.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer program product embodied on a non-transitory computer readable medium comprising computer code stored on the non-transitory computer readable medium and executable by a computer system for performing the following steps:
- identifying, by the computer system, a plurality of external systems that are remote from the computer system and with which the computer system is to communicate, the plurality of external systems including a database and a server;
- identifying, by the computer system, a type of connection required to interface the database;
- identifying, by the computer system, first information associated with a testing project that is stored by the database and that is to be accessed by the computer system;
- configuring, by the computer system based on the identified type of connection required to interface the database and the first information, a first logical module executable to perform a validation on the database, wherein the first logical module is further configured in accordance with at least one user group belonging to a certain testing team;
- identifying, by the computer system one or more user groups permitted to access the first logical module;
- defining, by the computer system for each user group of the one or more user groups, a level of access associated with the first logical module;
- identifying, by the computer system, a type of connection required to interface the server;
- identifying, by the computer system, a log that is stored by the server and that is to be accessed by the computer system;
- configuring, by the computer system based on the identified type of connection required to interface the server, a second logical module executable to perform a retrieval of the log from the server, wherein the second logical module is further configured in accordance with at least one user group belonging to a certain testing team;
- identifying, by the computer system one or more user groups permitted to access the second logical module;
- defining, by the computer system for each user group of the one or more user groups, a level of access associated with the second logical module;
- providing, to users of each user group of the user groups by the computer system, access to the first logical module and the second logical module in accordance with the level of access defined for the user group, including for a user of the users of at least one of the user groups:
  - determining that the first logical module and the second logical module are accessible to the user,
  - based on the determination that the first logical module and the second logical module are accessible to the user, displaying the first logical module and the second logical module to the user as a menu in a user interface,
  - responsive to receiving through the menu from the user a selection of the first logical module, executing, by the computer system, the first logical module to access the identified first information and to perform a validation on the database, and
  - responsive to receiving through the menu from the user a selection of the second logical module, executing, by the computer system, the second logical module to perform a retrieval of the log from the server.

2. The computer program product of claim 1, wherein the plurality of external systems are associated with the at least one testing project.

3. A method, comprising:
- identifying, by a computer system, a plurality of external systems that are remote from the computer system and with which the computer system is to communicate, the plurality of external systems including a database and a server;
- identifying, by the computer system, a type of connection required to interface the database;
- identifying, by the computer system, first information associated with a testing project that is stored by the database and that is to be accessed by the computer system;
- configuring, by the computer system based on the identified type of connection required to interface the database and the first information, a first logical module executable to access the identified first information and executable to perform a validation on the database, wherein the first logical module is further configured in accordance with at least one user group belonging to a certain testing team;
- identifying, by the computer system one or more user groups permitted to access the first logical module;
- defining, by the computer system for each user group of the one or more user groups, a level of access associated with the first logical module;
- identifying, by the computer system, a type of connection required to interface the server;
- identifying, by the computer system, a log that is stored by the server and that is to be accessed by the computer system;
- configuring, by the computer system based on the identified type of connection required to interface the server, a second logical module executable to perform a retrieval of the log from the server, wherein the second logical module is further configured in accordance with at least one user group belonging to a certain testing team;
- identifying, by the computer system one or more user groups permitted to access the second logical module;
- defining, by the computer system for each user group of the one or more user groups, a level of access associated with the second logical module;
- providing, to users of each user group of the user groups by the computer system, access to the first logical module and the second logical module in accordance with the level of access defined for the user group, including for a user of the users of at least one of the user groups:
  - determining that the first logical module and the second logical module are accessible to the user,
  - based on the determination that the first logical module and the second logical module are accessible to the user, displaying the first logical module and the second logical module to the user as a menu in a user interface,
  - responsive to receiving through the menu from the user a selection of the first logical module, executing, by the computer system, the first logical module to access the identified first information and to perform a validation on the database, and responsive to receiving through the menu from the user a selection of the second logical module, executing, by the computer system, the second logical module to perform a retrieval of the log from the server.

4. A system comprising:
a memory of a computer system; and
one or more processing cores of the computer system coupled to the memory that are each configured to:
identify, by the computer system, a plurality of external systems that are remote from the computer system and with which the computer system is to communicate, the plurality of external systems including a database and a server;
    identify, by the computer system, a type of connection required to interface the database;
    identify, by the computer system, first information associated with a testing project that is stored by the database and that is to be accessed by the computer system;
    configure, by the computer system based on the identified type of connection required to interface the database and the first information, a first logical module executable to access the identified first information and executable to perform a validation on the database, wherein the first logical module is further configured in accordance with at least one user group belonging to a certain testing team;
    identify, by the computer system one or more user groups permitted to access the first logical module;
    define, by the computer system for each user group of the one or more user groups, a level of access associated with the first logical module;
    identify, by the computer system, a type of connection required to interface the server;
    identify, by the computer system, a log that is stored by the server and that is to be accessed by the computer system;
    configure, by the computer system based on the identified type of connection required to interface the server, a second logical module executable to perform a retrieval of the log from the server, wherein the second logical module is further configured in accordance with at least one user group belonging to a certain testing team;
    identify, by the computer system one or more user groups permitted to access the second logical module;
    define, by the computer system for each user group of the one or more user groups, a level of access associated with the second logical module;
    provide, to users of each user group of the user groups by the computer system, access to the first logical module and the second logical module in accordance with the level of access defined for the user group, including for a user of the users of at least one of the user groups:
        determining that the first logical module and the second logical module are accessible to the user,
        based on the determination that the first logical module and the second logical module are accessible to the user, displaying the first logical module and the second logical module to the user as a menu in a user interface,
        responsive to receiving through the menu from the user a selection of the first logical module, executing, by the computer system, the first logical module to access the identified first information and to perform a validation on the database, and
        responsive to receiving through the menu from the user a selection of the second logical module, executing, by the computer system, the second logical module to perform a retrieval of the log from the server.

* * * * *